May 23, 1967 J. C. VAN DIJK 3,320,637
APPARATUS FOR MANUFACTURING THERMOPLASTIC PIPES
Filed April 27, 1964

INVENTOR:
JAN C. VAN DIJK
BY: Oswald H. Milmore
HIS ATTORNEY

United States Patent Office 3,320,637
Patented May 23, 1967

3,320,637
APPARATUS FOR MANUFACTURING
THERMOPLASTIC PIPES
Jan C. van Dijk, Delft, Netherlands, assignor to Shell Oil Company, a Delaware corporation
Filed Apr. 27, 1964, Ser. No. 362,807
Claims priority, application Netherlands, May 2, 1963, 292,212
5 Claims. (Cl. 18—14)

The invention relates to an apparatus for the manufacture of pipes by extruding a thermoplastic material, such as polyvinyl chloride, polyethylene or polypropylene, in which the inner wall of the extruded pipe is sized and simultaneously cooled by direct contact with a cooling liquid. Internal direct cooling is here used with the object of manufacturing pipes which, in comparison with pipes manufactured according to one of the manufacturing techniques usually employed, in which the extruded pipe is either not cooled or is only cooled by external direct or indirect cooling, possess considerably improved properties as regards fracturing under prolonged stress.

Broadly, the invention provides an apparatus for the manufacture of pipes from a thermoplastic material by extruding this material in a horizontal or substantially horizontal direction through an annular die head provided with a hollow mandrel concentrically arranged therein. Extrusion in a substantially horizontal direction here means extrusion in a direction which does not deviate more than 20° from the horizontal. Subsequent to the extrusion, sizing and cooling the inner wall of the extruded pipe is carried out by direct contact with a cooling liquid through means of an externally grooved sizing device. Hence, there is direct contact between the cooling liquid and the inner wall of the extruded pipe when the latter slides over the sizing device.

In the method according to the invention, it is essential to avoid contact of the mandrel with the cooling liquid; which contact results from backflowing of the cooling liquid in the direction of the mandrel. Otherwise the mandrel, and consequently the thermoplastic material to be extruded and the die head, would be able to cool down to a temperature lower than the temperature required for a good, even extrusion. The flowing-back of the cooling liquid in the direction of the mandrel is preferably prevented by excluding direct cooling during the very first part of the sizing. In this case there is in the first part of the sizing a tight fit between the inner wall of the extruded pipe and the outer surface of the sizing device, and no direct contact between cooling liquid and the inner wall of the pipe. Thus, direct contact with the coolant occurs only during the remaining part of the sizing.

The sizing device according to the invention is provided with an internal hollow space which communicates with a supply duct for cooling liquid, and has on the outer surface, which comes into contact with the inner wall of the extruded pipe during the extrusion, one or more recesses or grooves which communicate with the internal hollow space. Hence, during the extrusion, cooling liquid can come into direct contact with the inner wall of the extruded pipe via the said recesses or grooves.

The simplest embodiment of the device according to the invention is a hollow sizing pipe or bush having a cylindrical outer surface, the pipe wall of which is provided with one or more perforations and one of the ends of which is connected to a supply duct for cooling liquid. Preferably, however, the recesses or openings are designed as helical grooves, the points of communication with the hollow space within the sizing device being situated somewhere in the said grooves, but preferably at or near the beginning thereof which lies near the exit of the supply duct for cooling liquid. The points of communication with the hollow space are in this case formed by openings in the outer wall which issue into the grooves. A sizing device, provided on the outer surface with at least from two to six helical grooves is very suitable.

If only one helical groove is used, the width of it is preferably greater than half the pitch of the screw-turn. When a plurality of helical grooves are used all the grooves may either be left-hand or right-hand, but also one or more grooves may be left-hand and the rest right-hand or vice versa.

Although the sizing device according to the invention is preferably provided on the outer surface with helical grooves, the use of grooves having other shapes, such as annular grooves, or parallel grooves running lengthwise of the sizing device, are likewise possible. It is not necessary for all the recesses to be in direct communication with the internal hollow space; the said comunication may also be established indirectly, i.e., via other recesses. Thus, for example, if the recesses are designed as relatively deep annular grooves, the grooves may be interconnected via openings in that wall of the sizing device which is not provided with grooves, the first groove or the first few grooves being in direct communication with the internal hollow space. If helical grooves are used, the cooling liquid may flow via the outer surface which is not provided with grooves from one groove into another, it being unnecessary for the latter to be in direct communication with the internal hollow space.

The cooling liquid from the sizing device is wholly or partially, but preferably wholly, withdrawn through the recesses or grooves in the outer surface, to the internal surface of the extruded pipe. To this end the hollow space within the sizing device, apart from the inlet opening for cooling liquid in the points of communication with the recesses or the grooves, is preferably completely closed.

In order to prevent contact of cooling liquid with the mandrel of the die head during the extrusion, use may be made of one or more flexible seals which are arranged before the front side of the mandrel around the supply pipe for the cooling liquid. To this end use may also be made of a mandrel on the front side of which a layer of a thermally insulating material such as polytetrafluoroethylene is arranged. Preferably, however, the backflowing of cooling liquid in the direction of the mandrel, and consequently contact of cooling liquid with the mandrel, is prevented by the use of a sizing device whose outer surface is entirely free from recesses or grooves over a certain small distance, measured in the extrusion direction from the point where the inner wall of the extruded pipe first comes into contact with the outer surface of the sizing device. This part of the outer surface is therefore entirely smooth and nests tightly against the inner wall of the extruded pipe during the extrusion.

It has been found that an eminently satisfactory sizing device is one whose outer surface, after a first small part of which is completely smooth and free from recesses, is provided with at least two helical grooves, the width and pitch of which are such that the recessed or grooved surface is equal or substantially equal to the remaining outer surface. The sizing device may be made of metal or of a polymeric synthetic material having a high softening point, such as polytetrafluoroethylene.

The method according to the invention is of particular importance in the manufacture of pipes from highly crystalline thermoplastic material, such as solid ethylene polymers, in particular those, which are obtained by low-pressure processes such as the Ziegler process, polypropylene and the like. Other suitable thermoplastic materials are polyvinyl chloride, polymers containing styrene, and the like. Fillers, anti-oxidants, heat and light stabilizers, pigments and the like may be added to the thermoplastic material.

In the method according to the invention, water is usually used as a cooling liquid, but other liquids may also be employed, provided they are inert to the thermoplastic material, and have a boiling point below 60° C. The quantity of cooling liquid supplied may, if desired, be so large that the extruded pipe after passing the sizing device can be kept entirely filled with cooling liquid. The used liquid may, moreover, be recycled in the process.

In the simultaneous use of internal sizing and internal direct cooling according to the method of the invention, no difficulties occur when the extrusion starts. The extruded pipe slides remarkably easily over the sizing device, this being advantageous not only at the beginning of the extrusion but also thereafter, because the extruded pipe is lubricated by the coolant and can now be drawn over the sizing device with little application of force and without curling or buckling. Moreover, the direct cooling causes a rapid and particularly efficient transfer of heat during the sizing. In this connection it has been found that pipes provided with an external profiling, such as ribs and the like, may also very suitably be manufactured according to the invention. Such external profiling is, of course, not possible where prior art external sizing devices are employed.

My invention of simultaneously internally sizing and internally cooling by direct contact with a coolant has led to the manufacture of pipes having much better properties, as regards fracturing under prolonged stress, than pipes formed by the use of processes wherein the pipes are internally sized but are not simultaneously internally cooled via direct contact with the coolant. More specifically my invention produces a superior pipe to that formed in apparatus using a hollow internal sizing device which has no means for direct contact of the coolant with the extruded material during the sizing operation. Such a sizing device has openings in the end turned away from the extruding mandrel so that liquid coolant flowing through the sizing device only indirectly cools the extruded pipe via the material of the sizing device during the sizing operation and after the pipe has been sized it is directly cooled as the coolant flows through the openings directly into the pipe. In the use of this latter described type of sizing device the beginning of the pipe does not slide easily over the sizing device and has a marked tendency to show curling-up and ring effects. A further disadvantage of an internal sizing device which has no means for simultaneous internal cooling via direct contact of the pipe with the coolant is that there is no lubricating effect and extremely large tensile forces must be used to draw the pipe over the sizing device due to the tight fit therebetween.

In comparison with pipes which during the extrusion are not cooled by direct internal cooling or only simultaneously with an external direct or indirect cooling, the pipes manufactured according to the present invention possess considerably improved properties with respect to fracturing under prolonged stress. If cooling is effected from the outside as in external cooling, a solid outer surface layer is formed first, the low thermal conductivity of the material preventing a high rate of cooling of the inner surface. The formation of a solid external surface layer is attended with shrinkage due to crystallization and (or) thermal shrinkage. This shrinkage can easily occur when the internal material is still hot and soft. Further cooling leads to a gradual hardening of the inner layers, but shrinkage is prevented by the hard outer layer. Hence, appreciable internal stresses develop in the pipe wall, viz., a tensile stress in the inner layers and a compressive stress in the outer layers. It is evident that the internal stresses and the difference in structure can be reversed by applying internal instead of external cooling. This change can have a marked influence on the performance of the pipes in burst tests. Internal pressures in the pipes give rise to tangential stresses in the wall which are higher in the inner surface layers than at the outer surface. Internal tensile stresses in the inner surface and compressive stresses in the outer surface, occurring as a result of external cooling, will tend to increase this difference. However, in internally cooled pipe the differences in the stresses in the inner and outer layers will compensate each other, which results in a more uniform stress distribution in the pipe wall, and therefore a better performance in burst tests may be obtained.

By the method according to the invention, pipes may be manufactured which possess a much smoother inner surface than that obtained in pipes manufactured according to the techniques normally used. This is particularly advantageous in connection with the possible occurrence of fouling of materials passed through the finished pipe.

When the pipe is manufactured from certain crystallizing thermoplastic materials, still better fracturing under-prolonged-stress properties may be obtained by supplementing the direct internal cooling with some slight external direct cooling. In this case the external cooling should be carried out at a place where the inner wall of the pipe has already cooled down to a certain extent as a result of direct contact with cooling liquid, and preferably at a place where the thermoplastic material on the outside of the extruded pipe has not yet crystallized.

The invention will now be described with reference to the accompanying drawings wherein.

Figure 1:
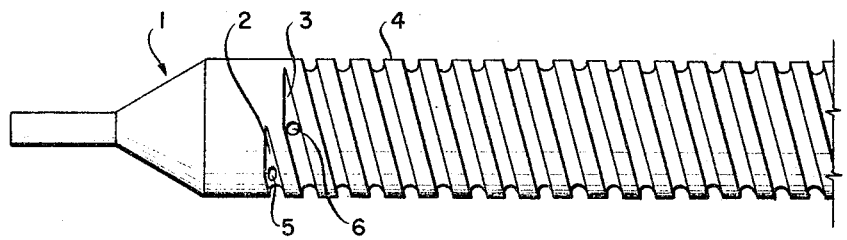
FIGURE 1 is a side view showing one embodiment of a sizing device in accordance with the invention.

Referring to FIGURE 1 of the drawings, a sizing device 1 is shown having two helical grooves 2 and 3 formed on the outer surface 4 of the sizing device. Two orifices 5 and 6 are situated at the beginning of the grooves 2 and 3, and communicate with a hollow space (not shown) within the sizing device 1.

Figure 2:
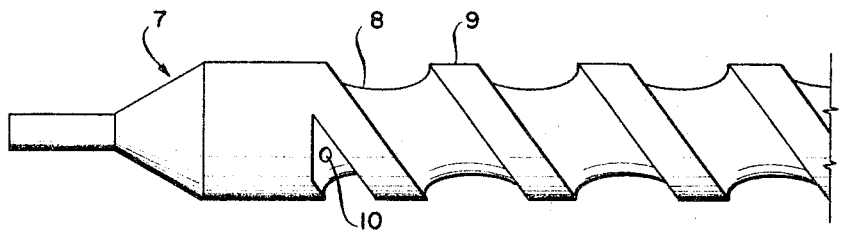
FIGURE 2 is a side view of another embodiment of a sizing device in accordance with the invention; and, FIGURE 3 is a longitudinal section of one arrangement of the invention illustrating the structural and positional relation between a die head and sizing device.

FIGURE 2 shows a slightly modified sizing device 7 having one helical groove 8 formed on the outer surface 9, the width of said groove being greater than half the pitch of the turn of the screw. The orifice 10 leads to a hollow cavity within the sizing device.

Figure 3:
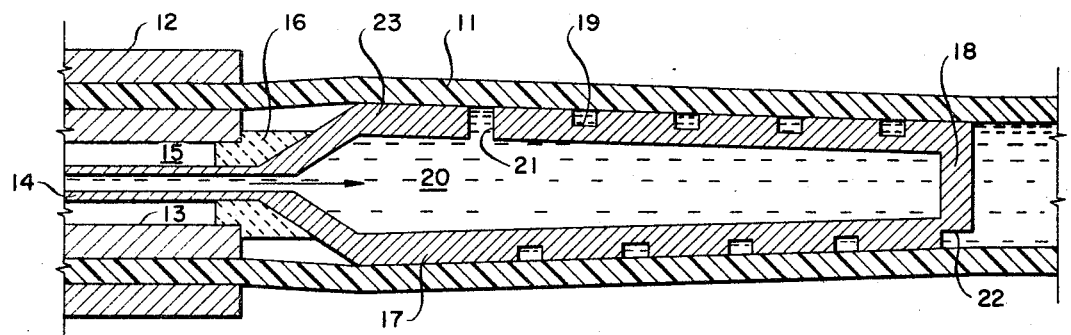

In FIGURE 3, there is shown a cylindrical pipe of thermoplastic material 11 which has been extruded through an annular die head 12. The die head 12 is provided with a hollow mandrel 13 concentrically arranged therein. A supply duct 14 for cooling liquid passes through the hollow mandrel 13 and is thermally insulated therefrom by means of an air jacket 15 and a plug 16 made of a thermally insulating material. A hollow internal sizing device 17 communicates with the supply duct 14 in such a manner that a cooling liquid may be passed through the supply duct into a hollow cavity 20 of the sizing device as shown by the arrow in FIGURE 3.

The outer surface of the sizing device 17 is slightly tapered in the direction of the closed end 18. The outer surface of the sizing device 17 is provided with recesses 19, which in this case are designed as one continuous helical groove. Communication between the groove 19 and the cooling liquid contained within the hollow cavity 20 of the sizing member 17 is provided through means of an orifice 21.

During extrusion of the cylindrical pipe 11 through the annular die head 12, the cooling liquid flows through the supply duct 14 into the cavity 20 and outward through orifice 21 to the helical groove 19 to thereby directly contact and cool the inner wall of the extruded pipe. Backflowing of the cooling liquid in the direction of the die head 12 is avoided, since the first part 23 of the outer surface of the sizing device 17 is completely smooth and free from recesses. At the end 22 of the screw-shaped groove 19 the cooling liquid flows into the extruded pipe 11, which if desired may be kept completely filled with cooling liquid. It is to be understood that the hollow space or cavity 20 may be terminated immediately after the orifice 21 leading to the groove 19 instead of extending to the end wall 18 as shown in FIGURE 3.

The method of the invention and the results obtained therewith will now be elucidated by the following examples:

*Example I*

Starting from a polypropylene with a melting index of 4.0, to which 2% of carbon black was added as filler, a pipe having an outside diameter of 25 mm. and a wall thickness of 2 mm. was manufactured by extruding at a temperature of 230° C. from a horizontal die head, having a hollow mandrel with a central, thermally insulated cooling water supply duct. This supply duct was in communication with an internal sizing device arranged at a distance of some centimeters from the front of the hollow mandrel and consisting of a 30 mm. long, hollow, brass pipe. The outer surface of the sizing device tapered somewhat in the direction of extrusion and was provided with 6 helical grooves. The tops of the grooves were in this case situated at a distance of 3 cm. from the end of the sizing device directed towards the hollow mandrel, so that the outer surface was entirely smooth over a distance of 3 cm. At the top of each groove there was an opening to the internal hollow space, which hollow space with the exception of the supply opening and the discharge openings to the grooves was otherwise completely closed. During extrusion of the pipe cooling water of approximately 15° C. was supplied at such a rate that the extruded tube was entirely filled with water beyond the sizing device; in this case the cooling liquid flowed via the grooves on the outer surface into the extruded pipe.

When the extrusion was started, the beginning of the extruded pipe slid easily over the sizing device. Also during the further extrusion, no difficulties were encountered in the movement of the pipe over the sizing device.

The pipe thus manufactured with the use of internal sizing with simultaneous direct internal cooling possessed a completely smooth inner surface. The pipe was tested at 95° C. under a tangential stress in the wall in the order of 70 kg./sq. cm., when the tube was filled with water. Under these conditions the average fracturing time was 120 hours. Tests with tangential stresses in the wall of 50 and 30 kg./sq. cm. resulted in average fracturing times of 325 and 1500 hours, respectively.

Control pipes of the same material, which, however, had been manufactured in the normal manner, using external sizing and external cooling, showed, at 95° C. and tangential stresses of 70, 50 and 30 kg./sq. cm., average fracturing times of 45, 155 and 900 hours, respectively.

In addition, a pipe was extruded using direct internal cooling and internal sizing with the aid of a hollow sizing device having an entirely smooth outer surface not provided with recesses, but otherwise under the same conditions as those obtaining in the above-described experiment. The end of the sizing device turned away from the hollow mandrel possessed a discharge opening for the cooling liquid, which flowed through the supply pipe and the hollow sizing device via the discharge opening into the extruded pipe. In this case the direct internal cooling did not take place simultaneously with, but only after the internal sizing.

The beginning of the extruded pipe was in this case very difficult to slide over the sizing device, while during further extrusion the extruded pipe showed a continuous tendency to cling round the sizing device, thus leading to curling-up and ring effects. The resultant pipe had an inner surface which was considerably less smooth than the inner surface of the pipe manufactured with the use of the sizing device whose surface was provided with grooves.

*Example II*

In the manner indicated in FIGURE 3, i.e., likewise using the same type sizing device the outer surface of which had six helical grooves, pipes were manufactured from a polyethylene having a high density (melting index 0.3) and containing no carbon black.

This time, however, some slight, local, direct cooling of the outer wall of the pipe was at the same time carried out, viz. at a point situated approximately 8 cm. in front of the end of the sizing device turned away from the hollow mandrel.

The extruded pipe slid smoothly and easily over the sizing device at the beginning of the extrusion and also later. The resultant pipe was tested at a temperature of 95° C. and a tangential stress in the wall of 30 kg./sq. cm., when the pipe was filled with water. The pipe tested in this way was still not broken after 2500 hours.

A control pipe which had been manufactured in the normal manner, using external cooling and external sizing, showed when tested under identical conditions, a fracturing time of 1050 hours.

Another control pipe obtained while using non-simultaneous internal sizing and internal cooling, with the aid of a sizing device whose outer surface was not provided with recesses, encountered serious difficulties during the extrusion when the pipe was moving over the sizing device and showed a less smooth inner surface than the pipe which was manufactured by means of a sizing device provided with grooves.

I claim as my invention:

1. Apparatus for extruding thermoplastic pipe, said apparatus comprising:
    annular discharge orifice means of an extrusion means;
    elongated sizing means coaxially disposed adjacent said discharge orifice means;
    said sizing means having a leading end and a trailing end, said leading end having a greater circumference than said trailing end, a tapering outer surface interconnecting said ends, groove means formed in said tapering surface and extending from a point intermediate said ends along said surface to said trailing end, said surface between said groove means and said leading end being substantially smooth, fluid duct means axially extending through said leading end and fluid conduit means communicating said duct means with said groove means, and a means for supplying coolant material to said duct means for flow therefrom into said groove means.

2. Apparatus as described by claim 1 wherein said sizing means has hollow cavity means formed therein, said duct means and said conduit means being in fluid communication with said cavity means.

3. Apparatus as set forth in claim 1 wherein said groove means are helical.

4. Apparatus as set forth in claim 1 wherein said outer surface of said sizing member is provided with at least two helical grooves.

5. Apparatus as set forth in claim 1 wherein said outer surface of said sizing member is provided with one helical groove the width of which is greater than half the pitch of the screw-turn.

References Cited by the Examiner

UNITED STATES PATENTS

| | | | |
|---|---|---|---|
| 2,814,071 | 11/1957 | Allan et al. | 264—210 X |
| 3,057,013 | 10/1962 | Loveless. | |
| 3,090,991 | 5/1963 | Hathaway. | |
| 3,129,461 | 4/1964 | Zavasnik et al. | |
| 3,142,092 | 7/1964 | Ralston. | |
| 3,160,918 | 12/1964 | Berggren et al. | |
| 3,212,135 | 10/1965 | Branscum. | |

FOREIGN PATENTS 802,939   10/1958   Great Britain.

ROBERT F. WHITE, *Primary Examiner.*

L. S. SQUIRES, T. J. CARVIS, *Assistant Examiners.*